(12) United States Patent
Al-Mehthel et al.

(10) Patent No.: US 9,834,477 B1
(45) Date of Patent: Dec. 5, 2017

(54) LIGHTWEIGHT FOAM CONCRETE WITH ELEMENTAL SULFUR

(71) Applicants: Saudi Arabian Oil Company, Dhahran (SA); King Fahd University of Petroleum and Minerals, Dhahran (SA)

(72) Inventors: Mohammed H. Al-Mehthel, Dhahran (SA); Mohammed Maslehuddin, Dhahran (SA); Saleh H. Al-Idi, Dhahran (SA); Mohammed Shameem, Dhahran (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 15/445,200

(22) Filed: Feb. 28, 2017

(51) Int. Cl.
  *C04B 22/02* (2006.01)
  *C04B 28/02* (2006.01)
  *C04B 18/02* (2006.01)
  *C04B 14/28* (2006.01)
  *C04B 38/10* (2006.01)
  *C04B 111/40* (2006.01)

(52) U.S. Cl.
  CPC ............. *C04B 22/02* (2013.01); *C04B 14/28* (2013.01); *C04B 18/02* (2013.01); *C04B 28/02* (2013.01); *C04B 38/10* (2013.01); *C04B 2111/40* (2013.01); *C04B 2201/30* (2013.01); *C04B 2201/50* (2013.01)

(58) Field of Classification Search
  CPC ......... C04B 14/28; C04B 18/02; C04B 22/02; C04B 28/02; C04B 38/10; C04B 2111/40; C04B 2201/30; C04B 2201/50
  See application file for complete search history.

(56) References Cited

U.S. PATENT DOCUMENTS

| | | | |
|---|---|---|---|
| 4,058,500 A | 11/1977 | Vroom | |
| 4,256,499 A * | 3/1981 | Terrel | C04B 28/36 501/140 |
| 4,426,456 A | 1/1984 | Gillott et al. | |
| 8,252,222 B2 * | 8/2012 | Biebaut | B28B 1/54 106/627 |
| 8,932,400 B2 | 1/2015 | Chen et al. | |
| 9,056,790 B2 | 6/2015 | Chen et al. | |
| 9,346,956 B2 | 5/2016 | Al-Mehthel et al. | |
| 2015/0031799 A1 | 1/2015 | Constantz et al. | |

FOREIGN PATENT DOCUMENTS

| | | |
|---|---|---|
| CN | 101555113 B | 5/2012 |
| CN | 102515824 B | 8/2013 |
| CN | 103265192 A | 8/2013 |
| CN | 104086215 B | 2/2016 |

* cited by examiner

*Primary Examiner* — Anthony J Green
(74) *Attorney, Agent, or Firm* — Bracewell LLP; Constance Gall Rhebergen

(57) ABSTRACT

A foam concrete with elemental sulfur has constituents that include a cement, a fine filler, an elemental sulfur in powder form, a coarse aggregate, a water, and a foam solution. The foam solution includes a foaming agent and a foaming water. The foam concrete has a compressive strength of at least 26 MPa, a thermal conductivity of less than 0.30 W/mK and a maximum dry weight of 1620 kg/m$^3$.

20 Claims, 1 Drawing Sheet

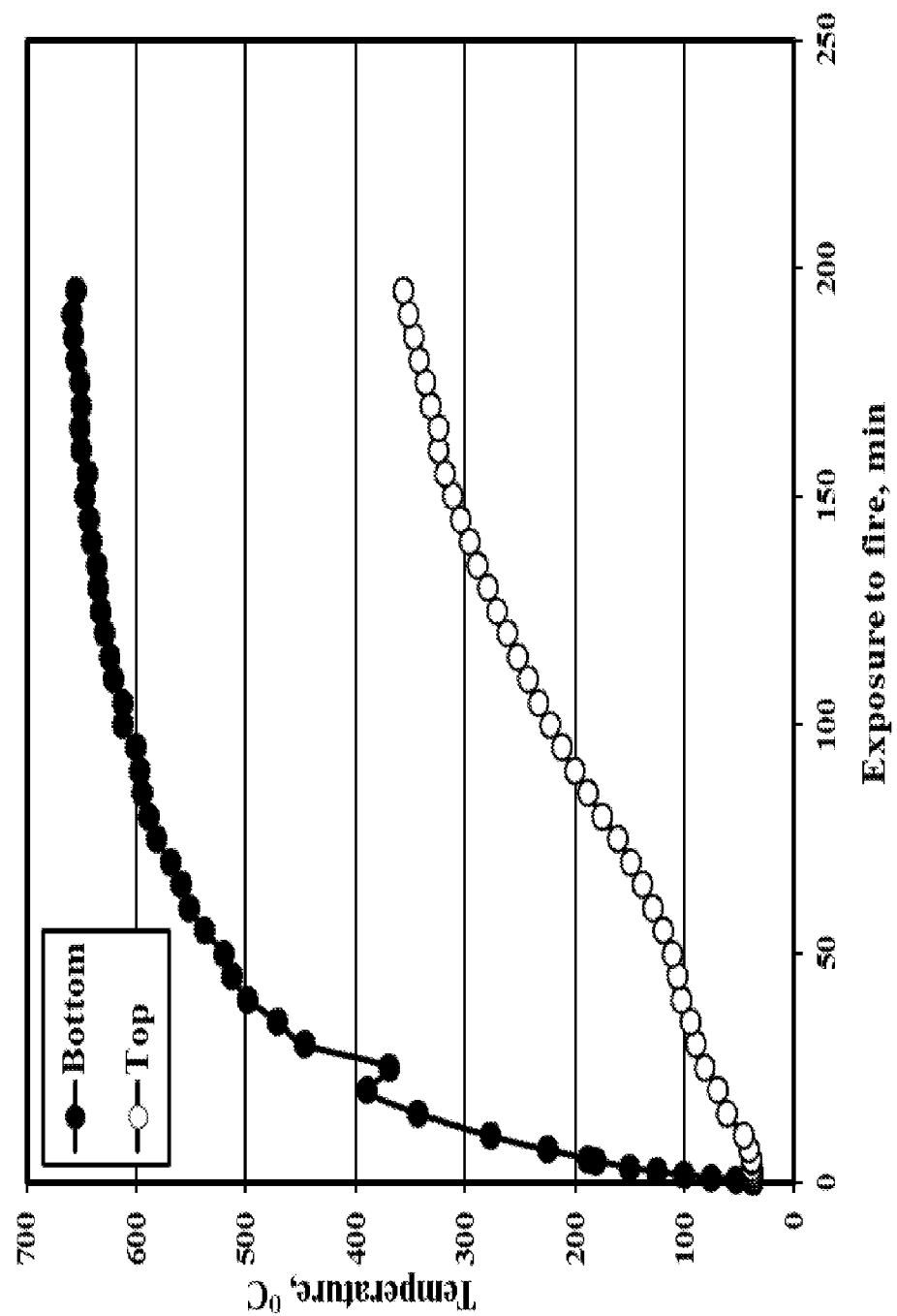

LIGHTWEIGHT FOAM CONCRETE WITH ELEMENTAL SULFUR

BACKGROUND OF THE DISCLOSURE

Field of the Disclosure

The present disclosure relates to a foam concrete. More specifically, the disclosure relates to a lightweight concrete composition using elemental sulfur, coarse aggregate and foam, and methods for making the same.

Description of the Related Art

Concrete can be used for various construction purposes. Lightweight concrete is defined as one that has a low density. This type of concrete is generally used in situations where there is a need to decrease the weight of structural elements. Some current lightweight concrete has a low compressive strength and therefore cannot be used in concrete applications that are load bearing, such as structural members. In order to provide sufficient compressive strength, a higher weight concrete, such as a conventional concrete, can be used for load-bearing concrete members. However, conventional concrete has higher thermal conductivity and higher weight and using a higher weight concrete or a greater amount of concrete can result in a heavy or bulky structure.

SUMMARY OF THE DISCLOSURE

Embodiments of this disclosure provide a lightweight foam concrete with elemental sulfur that has a lower thermal conductivity than prevailing conventional normal weight and lightweight concretes and provides a greater compressive strength than the current lightweight or foam concrete. Compositions and methods described herein provide a foam concrete that can be used to prepare slender structural components and the decrease in the size of the structural components compared to some current concretes decreases the overall cost of a structure. The compressive strength of the disclosed foam concrete is high enough to allow the foam concrete to be used for structural purposes as well as for masonry units, bricks, and insulating materials. Further, the thermal conductivity of the developed composition is lower than that of the conventional concrete and some current lightweight concretes, which can result in significant conservation of energy due to the high thermal resistance of the developed composition. The elemental sulfur in fine powdered form seals the fine pores in the concrete matrix giving better strength and lower thermal conductivity per unit weight than other foam concretes that lack elemental sulfur.

In an embodiment of this disclosure, a foam concrete with elemental sulfur has constituents that include a cement, a fine filler, an elemental sulfur in powder form, a coarse aggregate, a water, and a foam solution. The foam solution includes a foaming agent and a foaming water. The foam concrete has a compressive strength of at least 26 MPa, a thermal conductivity of less than 0.30 W/mK and a maximum dry unit weight of 1620 kg/m$^3$.

In alternate embodiments, the foam concrete can be free of additional additives. A dry unit weight of the foam concrete can be about 1617 kg/m$^3$. The foam solution can include the foaming agent and the foaming water in a ratio of about 175 parts by volume of the foaming agent to about 2500 parts by volume of the foaming water. The foam concrete can be free of an air-entraining agent.

In other alternate embodiments, the cement and the water together can comprise 74.0 wt % to 76.2 wt % of the constituents of the foam concrete, based on the weight of the foam concrete. The foam concrete can have a 28-day compressive strength of about 26.7 MPa. The water to the cement ratio can be about 0.35.

In yet other alternate embodiments, the constituents of the foam concrete can include:
the cement in an amount of 54 to 57 wt % of the constituents of the foam concrete;
the fine filler in an amount of 5.4 to 6.8 wt % of the constituents of the foam concrete;
the elemental sulfur in an amount of 4.5 to 5.6 wt % of the constituents of the foam concrete;
the coarse aggregate in an amount of 10.8 to 11.3 wt % of the constituents of the foam concrete;
the water in an amount of 19.7 to 20.2 wt % of the constituents of the foam concrete; and
the foam solution in an amount of 1.26 to 4.3 wt % of the constituents of the foam concrete, each based on the weight of the foam concrete.

Alternately, the constituents of the foam concrete can include:
the cement in an amount of about 57 wt % of the constituents of the foam concrete;
the fine filler in an amount of about 6.8 wt % of the constituents of the foam concrete;
the elemental sulfur in an amount of about 4.5 wt % of the constituents of the foam concrete
the coarse aggregate in an amount of about 11.3 wt % of the constituents of the foam concrete;
the water in an amount of about 19.9 wt % of the constituents of the foam concrete; and
the foam solution in an amount of about 1.26 wt % of the constituents of the foam concrete, each based on the weight of the foam concrete.

In an alternate embodiment of this disclosure, a foam concrete with elemental sulfur has constituents that include:
a cement in an amount of 54 to 56.3 wt % of the constituents of the foam concrete;
a fine filler in an amount of 5.4 to 6.8 wt % of the constituents of the foam concrete;
an elemental sulfur in powder form in an amount of 4.5 to 5.6 wt % of the constituents of the foam concrete;
a coarse aggregate in an amount of 10.8 to 11.3 wt % of the constituents of the foam concrete;
a water in an amount of 19.7 to 20.2 wt % of the constituents of the foam concrete; and
a foam solution in an amount of 1.26 to 4.3 wt % of the constituents of the foam concrete, each based on the weight of the foam concrete.

In alternate embodiments, the foam solution can include the foaming agent and the foaming water in a ratio of about 175 parts by volume of the foaming agent to about 2500 parts by volume of the foaming water, and wherein the foam concrete is free of an air-entraining agent. The constituents of the foam concrete can include:
the cement in an amount of about 56.3 wt % of the constituents of the foam concrete;
the fine filler in an amount of about 6.8 wt % of the constituents of the foam concrete;
the elemental sulfur in an amount of about 4.5 wt % of the constituents of the foam concrete;
the coarse aggregate in an amount of about 11.3 wt % of the constituents of the foam concrete;

the water in an amount of about 19.9 wt % of the constituents of the foam concrete; and the foam solution in an amount of about 1.26 wt % of the constituents of the foam concrete, each based on the weight of the foam concrete.

In another alternate embodiment of this disclosure, a method of forming a foam concrete includes the steps of mixing together the following constituents: a cement; a fine filler; an elemental sulfur in powder form; a coarse aggregate; and a water. The method further includes adding a foam solution that includes a foaming agent and a foaming water to arrive at the foam concrete that has a compressive strength of at least 26 MPa, a thermal conductivity of less than 0.30 W/mK and a maximum dry weight of 1620 kg/m$^3$.

In an alternate embodiment, the foam concrete can be free of fly ash, plasticizers, fiber, and an air-entraining agent. A dry weight of the foam concrete can be about 1617 kg/m$^3$. The foam solution can include the foaming agent and the foaming water in a ratio of about 175 parts by volume of the foaming agent to about 2500 parts by volume of the foaming water. The cement and the water together can comprise 74.0 wt % to 76.2 wt % of the constituents of the foam concrete, based on the weight of the foam concrete.

In other alternate embodiments, the constituents of the foam concrete can include:

the cement in an amount of 54 to 56.3 wt % of the constituents of the foam concrete;

the fine filler in an amount of 5.4 to 6.8 wt % of the constituents of the foam concrete;

the elemental sulfur in an amount of 4.5 to 5.6 wt % of the constituents of the foam concrete;

the coarse aggregate in an amount of 10.8 to 11.3 wt % of the constituents of the foam concrete;

the water in an amount of 19.7 to 20.2 wt % of the constituents of the foam concrete; and the foam solution in an amount of 1.26 to 4.3 wt % of the constituents of the foam concrete, each based on the weight of the foam concrete.

Alternately, the constituents of the foam concrete can include:

the cement in an amount of about 56.3 wt % of the constituents of the foam concrete;

the fine filler in an amount of about 6.8 wt % of the constituents of the foam concrete;

the elemental sulfur in an amount of about 4.5 wt % of the constituents of the foam concrete the coarse aggregate in an amount of about 11.3 wt % of the constituents of the foam concrete;

the water in an amount of about 19.9 wt % of the constituents of the foam concrete; and the foam solution in an amount of about 1.26 wt % of the constituents of the foam concrete, each based on the weight of the foam concrete.

BRIEF DESCRIPTION OF THE DRAWINGS

So that the manner in which the above-recited features, aspects and advantages of the embodiments disclosed, as well as others that will become apparent, are attained and can be understood in detail, more particular description of the disclosure briefly summarized above can be had by reference to the embodiments that are illustrated in the drawings that form a part of this specification. It is to be noted, however, that the appended drawings illustrate some embodiments of the disclosure and are, therefore, not to be considered limiting of the disclosure's scope, for the disclosure can admit to other equally effective embodiments.

The FIGURE is a graph showing the bottom and top temperatures over time of a foam concrete slab prepared in accordance with an embodiment of this disclosure.

DETAILED DESCRIPTION OF THE DISCLOSURE

Compositions and methods described in this disclosure provide for a foam concrete with constituents that include a cement, a fine filler, a coarse aggregate, an elemental sulfur, a water, and a foam solution.

Concrete is a composition made from cement, water, and aggregate or aggregates. While "aggregate" can be plural, the term "aggregates" generally refers to more than one type or more than one size of aggregate. Cement is a binder that can bind the aggregates together. Ordinary Portland cement is one such binder that can bind to other materials, such as fine and coarse aggregates, thereby holding them together. A material that is a paste that can harden to bind materials together, in the manner of cement, is said to be a cementitious material or to have cementitious properties. One of skill in the art will appreciate that water can be added to dry cement to make cement paste. The water-cement ratio ("w/c ratio") of conventional normal weight concrete is typically between 0.40 and 0.45. By way of explanation, a w/c ratio of 0.20 indicates that there is one part water to five parts Portland cement (1/5=0.20). A w/c ratio of 0.5 indicates one part water to two parts cement. The cement of embodiments of this disclosure can be, for example, a Type I Portland Cement. However, any type of cement, including a pozzolanic cement, can be used to produce lightweight concrete developed in this disclosure. In certain embodiments, a pozzolanic material can alternately be used as a filler.

As one of ordinary skill will appreciate, various types of conventional aggregates can be used as a filler in the concrete. As one of skill in the art will appreciate, the term "aggregates" can refer to aggregate of multiple types or sizes. Aggregate can include, for example, gravel, crushed rock, slag, or any other type of aggregate. When aggregate is used in concrete, the cement generally coats the aggregates and then binds them together in a matrix. When aggregates of various sizes are used, the smaller aggregate materials can fill voids between the larger aggregate materials, thus creating a denser matrix. Coarse aggregates generally include gravel or crushed stone with particles predominantly larger than 5 mm and typically between 9.5 mm and 37.5 mm.

In embodiments of the foam concrete of this disclosure, a coarse aggregate can be used that is cheap and readily available. The desired properties of the composition of this disclosure are achieved without the need for expensive or difficult to source aggregates. Compositions of this disclosure can include coarse aggregates with a density in a range of 1400-1600 kg/m$^3$. Therefore, the desired weight and strength properties of the composition of this disclosure are achieved without the need for specialty or lightweight aggregates. In examples of this disclosure, the coarse aggregate can be limestone aggregate that is widely used, readily available, and relatively inexpensive.

Embodiments of this disclosure include a fine filler. The fine filler can also be common and easily available material, such as limestone powder. As used in this disclosure, any material that passes through a #50 sieve is defined as fine filler. The example limestone powder used in developing a sample specimen of this disclosure ranged in size from 5-20 μm.

In embodiments of this disclosure, the sulfur concrete is free of an active filler. An active filler is a polymer that acts as a binder and it modifies certain properties of sulfur concrete, such as its stiffness. These filler types are costly; consequently it is desirable to use any other filler that is cheap and also influences the properties of a sulfur concrete in a way similar to the active fillers do.

Sulfur, especially "free" or "elemental" sulfur, is an abundant and inexpensive material. Elemental sulfur is naturally occurring. Elemental sulfur is also a byproduct of non-sweet natural gas and petroleum processing. Sources of free sulfur include: petroleum refineries and gas sweetening plants. Because of the quantity of sulfur extracted from natural gas and petroleum, many sulfur producers consider elemental sulfur a waste product. It is desirable to find commercial uses for elemental sulfur. Incorporating sulfur into commercial products can transform what many consider a potential "waste" product into a product that has practical value. When used in embodiments of this disclosure, the elemental sulfur can be in fine powdered form so that the elemental sulfur seals the fine pores in the concrete matrix, giving the end product improved strength. The particle size of elemental sulfur used in this disclosure is in the range of 10-20 μm.

The elemental sulfur includes not only singular sulfur atoms but also sulfur in complexes and covalently bonded to other sulfur atoms, including α-sulfur (orthorhombic sulfur), β-sulfur (monoclinic sulfur), and "catena" sulfur. Chains or rings of sulfur atoms range from a few sulfur atoms to hundreds of covalently linked sulfur atoms. Because of the wide variety of allotropes, elemental sulfur is found in many different solid and liquid forms, and changes between forms based upon modifications to its environment.

Sulfur covalently bonded with non-sulfur atoms, such as carbon, hydrogen or other atomic species, including hetero-organic compounds, is not "free" or elemental sulfur. Elemental sulfur should not contain any significant amounts of impurities.

Sulfur can form hydrogen sulfide ($H_2S$) gas, which is toxic to humans, starting at around 150° C. Above that temperature, free sulfur in hydrocarbon environments dehydrogenates and forms hydrogen sulfide. Heating sulfur to high temperatures in the presence of oxygen forms sulfur dioxide, which is noxious to humans and is an air pollutant. It is desirable to find a combination of materials that can be mixed at temperatures no greater than 150° C., and preferably no greater than 140° C. for worker comfort and safety as well as being safer to the environment.

A foam solution can be used, such as a commercially available foaming agent that forms a solution when mixed with water. One such commercially available foaming agent is EABASSOC Foaming Agent available through E-A-B Associates. Other commercially available foaming agents can alternately be used, and in each case, prepared in accordance with the vendor instructions. As an example, compressed air can be introduced in the foaming agent plus water to form foam. The water mixed with the foaming agent to form the foam solution is separate from the amount of water used as a separate constituent of the foam concrete, as described in this disclosure. In this specification, the water used to mix with the foaming agent to form a foam solution will be referred to as foaming water.

In embodiments of this disclosure, the foam concrete is prepared without the use of an air-entraining agent. An air-entraining agent is used in current art to create air bubbles that accommodate the formation of ice under freezing temperatures. The use of a foaming agent forms smaller size air voids that contribute to a lighter concrete. The air voids formed due to the use of an air-entraining agent are bigger in size than those formed due to the use of a foaming agent. Therefore, an air-entraining agent would not be desirable in the foam concrete of the current application.

In preparing the foam concrete in accordance with embodiments of this disclosure, the range of wt % each of the constituents, which include a cement, a fine filler, a coarse aggregate, an elemental sulfur, a water, and a foam solution, can be found in Table 1. As used in this disclosure, the unit wt % is measured relative to the weight of the foam concrete, unless indicated otherwise.

TABLE 1

Weight composition ranges of foam concrete with elemental sulfur.

| Constituent | Possible range wt % |
|---|---|
| Cement | 54-56.3 |
| Fine Filler | 5.4-6.8 |
| Coarse aggregate # 8 | 10.8-11.3 |
| Elemental Sulfur | 4.5-5.6 |
| Water | 19.7-20.2 |
| Foam solution | 1.3-4.3 |

In certain embodiments, the cement can make up 54 wt % to 56.3 wt % of the constituents of the foam concrete, as shown in mix 2, 3 and 4 of Table 2 and in the Test Mix of Table 3. In determining the ratios of the constituents, the combination of water and cement can make up 74 wt % to 76.2 wt % of the constituents of the foam concrete, based on the weight of the foam concrete, as shown in mix 2, 3 and 4 of Table 2 and in the Test Mix of Table 3. Both water and cement are required to form a paste that can easily bind the aggregate.

In alternate embodiments, the wt % of each of the constituents can be within other ranges, as shown in the mixes of Tables 1-3. In certain embodiments the fine filler can be in an amount of 5.4 wt % to 6.8 wt % of the constituents of the foam concrete. In alternate embodiments, the aggregate can be in an amount of 10.8 wt % to 11.3 wt % of the constituents of the foam concrete. In certain embodiments the elemental sulfur can be in an amount of 4.5 wt % to 5.6 wt % of the constituents of the foam concrete. In certain embodiments the water can be in an amount of 19.7 wt % to 20.2 wt % of the constituents of the foam concrete. In certain embodiments the foam solution can be in an amount of 1.26 wt % to 4.3 wt % of the constituents of the foam concrete.

The foam concrete is free of additional additives. The foam concrete is also free of fly ash, plasticizers and fiber. There is no need to add plasticizer since the foam concrete will be a semi-liquid form and it can be easily placed. The presence of fibers will hinder the formation of foam concrete. Therefore, plasticizers and fiber materials do not provide an advantage to the foam concrete and will increase the cost of the resulting product. Therefore, embodiments of this disclosure provide the benefits of a lightweight and load-bearing product without the need for costly and harder to source materials.

The resulting foam concrete is a lightweight concrete product that can be used as an insulating and structural load-bearing member. For example, the compressive strength of a concrete product formed in accordance with this disclosure can have a compressive strength of at least 26 MPa, and can be in a range of 26 MPa to 27 MPa, and in certain embodiments, can have a compressive strength of about 27 MPa. A concrete product formed in accordance with this disclosure can have a thermal conductivity of less than 0.3 W/mK, such as 0.293 W/mK, and can have a maximum unit weight of 1620 kg/m$^3$ with a range of 1615 kg/m$^3$ to 1620 kg/m$^3$, and in one example can have a unit weight of 1617 kg/m$^3$.

disclosure. Therefore, the use of sulfur in lieu of sand lead to a decrease in the unit weight and thermal conductivity.

EXAMPLES

Several trial mixtures of foam concrete were prepared. The weights of the mixture constituents in the trial mixtures are shown in Table 2.

TABLE 2

Weight of the constituents in the trial mixtures.

Weight of constituents

| Mix # | Spec-imen # | Cement, g | Fine filler, g | Coarse aggregate, g | Elemental sulfur, g | Water, ml | Foam solu-tion, ml | (W + F)/C ratio | Compres-sive strength, MPa | Unit weight, kg/m$^3$ |
|---|---|---|---|---|---|---|---|---|---|---|
| 1 | 1 | 500 | 50 | 100 | 50 | 185 | 40 | 0.45 | 13.0 | 1553 |
|   | 2 | 500 | 50 | 100 | 50 | 185 | 40 | 0.45 | 14.3 | 1562 |
|   | 3 | 500 | 50 | 100 | 50 | 185 | 40 | 0.45 | 13.6 | 1591 |
| 2 | 1 | 500 | 50 | 100 | 50 | 185 | 30 | 0.43 | 17.7 | 1527 |
|   | 2 | 500 | 50 | 100 | 50 | 185 | 30 | 0.43 | 22.4 | 1572 |
|   | 3 | 500 | 50 | 100 | 50 | 185 | 30 | 0.43 | 15.8 | 1527 |
| 3 | 1 | 500 | 50 | 100 | 50 | 175 | 15 | 0.38 | 27.0 | 1573 |
|   | 2 | 500 | 50 | 100 | 50 | 175 | 15 | 0.38 | 24.8 | 1591 |
|   | 3 | 500 | 50 | 100 | 50 | 175 | 15 | 0.38 | 21.4 | 1578 |
| 4 | 1 | 500 | 60 | 100 | 40 | 177 | 11.2 |  | 27.23 | 1620 |
|   | 2 | 500 | 60 | 100 | 40 | 177 | 11.2 |  | 26.26 | 1615 |
|   | 3 | 500 | 60 | 100 | 40 | 177 | 11.2 |  | 26.52 | 1616 |
| 5 | 1 | 500 | 0 | 0 | 200 | 220 | 10 | 0.46 | — |  |
|   | 2 | 500 | 0 | 0 | 200 | 220 | 10 | 0.46 | — | — |
|   | 3 | 500 | 0 | 0 | 200 | 210 | 10 | 0.46 | — | — |
| 6 | 1 | 500 | 0 | 0 | 200 | 210 | 20 | 0.46 | — | — |
|   | 2 | 500 | 0 | 0 | 200 | 210 | 20 | 0.46 | — | — |
|   | 3 | 500 | 0 | 0 | 200 | 220 | 20 | 0.46 | — | — |
| 7 | 1 | 500 | 0 | 0 | 200 | 200 | 30 | 0.46 | — | — |
|   | 2 | 500 | 0 | 0 | 200 | 200 | 30 | 0.46 | — | — |
|   | 3 | 500 | 0 | 0 | 200 | 200 | 30 | 0.46 | — | — |
| 8 | 1 | 500 | 0 | 0 | 200 | 190 | 40 | 0.46 | — | — |
|   | 2 | 500 | 0 | 0 | 200 | 190 | 40 | 0.46 | — | — |
|   | 3 | 500 | 0 | 0 | 200 | 190 | 40 | 0.46 | — | — |
| 9 | 1 | 500 | 0 | 0 | 200 | 180 | 50 | 0.46 | — | — |
|   | 2 | 500 | 0 | 0 | 200 | 180 | 50 | 0.46 | — | — |
|   | 3 | 500 | 0 | 0 | 200 | 180 | 50 | 0.46 | — | — |
| 10 | 1 | 500 | 0 | 0 | 200 | 170 | 60 | 0.46 | — | — |
|    | 2 | 500 | 0 | 0 | 200 | 170 | 60 | 0.46 | — | — |
|    | 3 | 500 | 0 | 0 | 200 | 170 | 60 | 0.46 | — | — |

In order to form the foam concrete, the cement, the fine filler, the elemental sulfur, the coarse aggregate, and the water can be mixed in the usual manner. The foam solution can be prepared and added to the other pre-mixed constituents to arrive at the foam concrete. When being mixed, the constituents can be used at ambient temperature and is not heated to an elevated temperature. The foam concrete can be cured with the application of water at ambient pressure. For example, the foam concrete can be cured by water immersion, ponding, fogging or wet covering. In certain embodiments, water ponding can be performed by forming dykes around the foam concrete member so that a layer of water is maintained on the foam concrete member over the duration of the curing time.

In another study, foam concrete was produced utilizing about 10% foam, limestone filler, coarse aggregate and sand. The compressive strength of such sand mixture was similar to the compressive strength of mixtures described in this disclosure. However, the unit weight and the thermal conductivity of such sand mixture was more than the unit weight and the thermal conductivity of mixtures described in this For the specimens shown in Table 2, the foam solution includes a foaming agent and a foaming water in a ratio of about 175 parts by volume of foaming agent to about 2500 parts by volume of foaming water. During the trials, Mix #s 5, 6, 7, 8, 9 and 10 were discarded as leaching of sulfur was noted during curing. Based on the trials a mixture was selected for detailed evaluation. The weights of constituents in the tested mixture are shown in Table 3.

TABLE 3

Weights of constituents in foam concrete used for the detailed evaluation.

| Constituent | Tested Mix wt % |
|---|---|
| Cement | 56.3 |
| Fine filler | 6.8 |
| Coarse aggregate # 8 | 11.3 |
| Elemental Sulfur | 4.5 |
| Water | 19.9 |
| Foam solution | 1.26 |

As can be calculated from the values in Table 3, the water to cement ratio (w/c) is 0.35, and the water plus foam to cement ratio ((w+f)/c) is 0.39. The water plus cement makes us 76.2 wt % of the foam concrete.

Foam concrete slab specimens of size 250×150×50 mm were prepared for exposure to fire at about 600° C. Visual examination and photographic evidence was collected after the exposure. A comparison was made before and after the exposure to fire. The specimens were subjected to fire until the loss of structural stability, and time for the initiation of the deterioration was noted.

The FIGURE shows the temperature variation in the top and bottom surfaces of the foam concrete slab specimen. As expected, the temperature at the bottom surface (exposed to fire) is more than that on the top surface (not exposed to fire). After about two hours of exposure to fire the temperature at the top surface is almost half that on the bottom surface. This reduction in temperature between the bottom surface and the top surface is about 75% and 55% after exposure to fire for 20 and 120 minutes, respectively.

A guarded hot plate that conforms to ASTM Standard C177 was used for the measurement of thermal conductivity under steady-state heat flow conditions. The thermal conductivity measuring equipment is suitable for testing non-homogeneous materials, such as concrete, masonry, wood products, cellular plastics, etc. The accuracy of the test equipment is about ±4% of the true value of the thermal conductivity.

The test specimens of dimensions 35 cm×35 cm×5 cm were prepared and tested in the guarded hot plate. The surfaces of the specimens must be flat and parallel to minimize contact resistance between these two surfaces and the corresponding hot and cold plate surfaces. Due to the rough surfaces of the specimens, it was not possible to get the flat and parallel surfaces. An uneven surface would result in a significant temperature difference between the hot plate and the corresponding specimen surface. To overcome this problem, thermocouple wires were fixed on both sides of the specimen. A multi-channel programmable data logger monitored the surface temperatures at hourly intervals. The arithmetic mean of the temperatures measured by these thermocouples on each side was used in the calculation instead of those from hot and cold surfaces of the guarded hotplate. The specimens were covered with a blanket on both sides to have smooth contact with the plate surfaces. The specimen temperatures were monitored until steady-state conditions were obtained. The thermal conductivity, k [w/m·K], for the test specimen was calculated by the following equation:

$$k = \frac{Qd}{A(T_h - T_c)}$$

Where:
Q [Watts] is the heat flow through the specimen;
d [m] is the thickness of the test specimen;
$T_h$ [° C.] is the temperature of the hot side of the test specimen;
$T_c$ [° C.] is the temperature of the cold side of the test specimen; and
A [m²] is the area of the heater.

Looking at The FIGURE, as expected, the temperature at the bottom surface (exposed to fire) is more than that on the top surface (not exposed to fire). After about two hours of exposure to the fire, the temperature at the top surface is less than half of the temperature on the bottom surface. Over time, the temperature of the top surface remains around half of the temperature of the bottom surface temperature.

In a separate test, three 100×100×100 mm specimens were tested in compression according to ASTM C39 in order to determine the compressive strength of the foam concrete.

The results of the tests of the tested specimens are shown in Table 4.

TABLE 4

Properties of the developed foam concrete.

| Test | Result |
| --- | --- |
| Dry unit weight (kg/m³) | 1,617 |
| Thermal conductivity (W/m.K) | 0.293 |
| 28-day compressive strength (MPa) | 26.7 |
| 90-day compressive strength (MPa) | 28.34 |

The tested specimen therefore has a sufficient compressive strength to be used in a structural member. Foam concrete in accordance with embodiments of this disclosure can be lighter than traditional structural concretes that are used as structural members by more than 40%, providing a lighter weight product overall. As an example, traditional structural concretes can have a dry unit weight of around 2,400 kg/m³.

In addition, foam concrete in accordance with embodiments of this disclosure can have a thermal conductivity that is less than 30% of the thermal conductivity of traditional normal weight structural concretes, which can be in a range of 1 to 1.8 W/m·K. The decrease in the unit weight and thermal conductivity of the disclosed foam concrete reduces the weight of the concrete members, leads to energy conservation, and reduces the overall cost of the infrastructure. Therefore, embodiments of this disclosure can be utilized to produce lighter concrete elements with good compressive strength and better insulation properties or structural applications and in concrete masonry units, bricks and for insulation purposes. The performance of the produced mix of this application is better than that of the conventional foam concrete in terms of strength, it is lighter than the conventional concrete, and has better thermal properties than conventional concrete. The concrete elements formed in accordance with embodiments of this disclosure can be used as structural items without requiring additional internal or external support structure, such as reinforcing steel, or other types of structural framework.

Although embodiments of the present disclosure have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

As used herein, the term "about" modifying the quantity or property refers to variation in the numerical quantity that can occur, for example, through typical measuring and handling procedures in the real world; through inadvertent error in these procedures; through differences in the manufacture, source, or purity of the ingredients employed to make the compositions or carry out the methods; and the like. In any case, the term "about" means within 10% of the reported numerical value, preferably within 5% of the reported numerical value.

Throughout this application, where patents or publications are referenced, the disclosures of these references in their entireties are intended to be incorporated by reference into this application, in order to more fully describe the state of the art to which the disclosure pertains, except when these references contradict the statements made herein.

What is claimed is:

1. A foam concrete with elemental sulfur, constituents of the foam concrete comprising:
    a cement;
    a fine filler;
    an elemental sulfur in powder form;
    a coarse aggregate;
    a water; and
    a foam solution; wherein
    the foam solution includes a foaming agent and a foaming water; and
    the foam concrete has a compressive strength of at least 26 MPa, a thermal conductivity of less than 0.30 W/mK and a maximum dry weight of 1620 kg/m$^3$.

2. The foam concrete of claim 1, wherein the foam concrete is free of additional additives.

3. The foam concrete of claim 1, wherein a dry weight of the foam concrete is about 1617 kg/m$^3$.

4. The foam concrete of claim 1, wherein the foam solution includes the foaming agent and the foaming water in a ratio of about 175 parts by volume of the foaming agent to about 2500 parts by volume of the foaming water.

5. The foam concrete of claim 1, wherein the foam concrete is free of an air-entraining agent.

6. The foam concrete of claim 1, wherein the cement and the water together comprise 74.0 wt % to 76.2 wt % of the constituents of the foam concrete, based on the weight of the foam concrete.

7. The foam concrete of claim 1, wherein the foam concrete has a 28 day compressive strength of about 26.7 MPa.

8. The foam concrete of claim 1, wherein the water to cement ratio is about 0.35.

9. The foam concrete of claim 1, wherein the constituents of the foam concrete include:
    the cement in an amount of 54 to 56.3 wt % of the constituents of the foam concrete;
    the fine filler in an amount of 5.4 to 6.8 wt % of the constituents of the foam concrete;
    the elemental sulfur in an amount of 4.5 to 5.6 wt % of the constituents of the foam concrete;
    the coarse aggregate in an amount of 10.8 to 11.3 wt % of the constituents of the foam concrete;
    the water in an amount of 19.7 to 20.2 wt % of the constituents of the foam concrete; and
    the foam solution in an amount of 1.26 to 4.3 wt % of the constituents of the foam concrete, each based on the weight of the foam concrete.

10. The foam concrete of claim 1, wherein the constituents of the foam concrete include:
    the cement in an amount of about 56.3 wt % of the constituents of the foam concrete;
    the fine filler in an amount of about 6.8 wt % of the constituents of the foam concrete;
    the elemental sulfur in an amount of about 4.5 wt % of the constituents of the foam concrete;
    the coarse aggregate in an amount of about 11.3 wt % of the constituents of the foam concrete;
    the water in an amount of about 19.9 wt % of the constituents of the foam concrete; and
    the foam solution in an amount of about 1.26 wt % of the constituents of the foam concrete, each based on the weight of the foam concrete.

11. A foam concrete with elemental sulfur, constituents of the foam concrete comprising:
    a cement in an amount of 54 to 56.3 wt % of the constituents of the foam concrete;
    a fine filler in an amount of 5.4 to 6.8 wt % of the constituents of the foam concrete;
    an elemental sulfur in powder form in an amount of 4.5 to 5.6 wt % of the constituents of the foam concrete;
    a coarse aggregate in an amount of 10.8 to 11.3 wt % of the constituents of the foam concrete;
    a water in an amount of 19.7 to 20.2 wt % of the constituents of the foam concrete; and
    a foam solution in an amount of 1.26 to 4.3 wt % of the constituents of the foam concrete, each based on the weight of the foam concrete.

12. The foam concrete of claim 11, wherein the foam solution includes the foaming agent and the foaming water in a ratio of about 175 parts by volume of the foaming agent to about 2500 parts by volume of the foaming water, and wherein the foam concrete is free of an air-entraining agent.

13. The foam concrete of claim 11, wherein the constituents of the foam concrete include:
    the cement in an amount of about 56.3 wt % of the constituents of the foam concrete;
    the fine filler in an amount of about 6.8 wt % of the constituents of the foam concrete;
    the elemental sulfur in an amount of about 4.5 wt % of the constituents of the foam concrete;
    the coarse aggregate in an amount of about 11.3 wt % of the constituents of the foam concrete;
    the water in an amount of about 19.9 wt % of the constituents of the foam concrete; and
    the foam solution in an amount of about 1.26 wt % of the constituents of the foam concrete, each based on the weight of the foam concrete.

14. A method of forming a foam concrete, the method comprising the steps of:
    mixing together the following constituents:
        a cement;
        a fine filler;
        an elemental sulfur in powder form;
        a coarse aggregate; and
        a water; and
    adding a foam solution that includes a foaming agent and a foaming water to arrive at the foam concrete that has a compressive strength of at least 26 MPa, a thermal conductivity of less than 0.30 W/mK and a maximum dry weight of 1620 kg/m$^3$.

15. The method of claim 14, wherein the foam concrete is free of fly ash, plasticizers, fiber, and an air-entraining agent.

16. The method of claim 14, wherein a dry weight of the foam concrete is about 1617 kg/m$^3$.

17. The method of claim 14, wherein the foam solution includes the foaming agent and the foaming water in a ratio of about 175 parts by volume of the foaming agent to about 2500 parts by volume of the foaming water.

18. The method of claim 14, wherein the cement and the water together comprise 74.0 wt % to 76.2 wt % of the constituents of the foam concrete, based on the weight of the foam concrete.

19. The method of claim 14, wherein the constituents of the foam concrete include:
- the cement in an amount of 54 to 56.3 wt % of the constituents of the foam concrete;
- the fine filler in an amount of 5.4 to 6.8 wt % of the constituents of the foam concrete;
- the elemental sulfur in an amount of 4.5 to 5.6 wt % of the constituents of the foam concrete;
- the coarse aggregate in an amount of 10.8 to 11.3 wt % of the constituents of the foam concrete;
- the water in an amount of 19.7 to 20.2 wt % of the constituents of the foam concrete; and
- the foam solution in an amount of 1.26 to 4.3 wt % of the constituents of the foam concrete, each based on the weight of the foam concrete.

20. The method of claim 14, wherein the constituents of the foam concrete include:
- the cement in an amount of about 56.3 wt % of the constituents of the foam concrete;
- the fine filler in an amount of about 6.8 wt % of the constituents of the foam concrete;
- the elemental sulfur in an amount of about 4.5 wt % of the constituents of the foam concrete;
- the coarse aggregate in an amount of about 11.3 wt % of the constituents of the foam concrete;
- the water in an amount of about 19.9 wt % of the constituents of the foam concrete; and
- the foam solution in an amount of about 1.26 wt % of the constituents of the foam concrete, each based on the weight of the foam concrete.

\* \* \* \* \*